US012309593B2

(12) United States Patent
Petit et al.

(10) Patent No.: US 12,309,593 B2
(45) Date of Patent: May 20, 2025

(54) TECHNIQUES FOR MISBEHAVIOR DETECTION IN WIRELESS COMMUNICATIONS SYSTEMS

(71) Applicant: QUALCOMM Incorporated, San Diego, CA (US)

(72) Inventors: Jonathan Petit, Wenham, MA (US); Jean-Philippe Monteuuis, Shrewsbury, MA (US); Mohammad Raashid Ansari, Lowell, MA (US); Cong Chen, Shrewsbury, MA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 17/484,806

(22) Filed: Sep. 24, 2021

(65) Prior Publication Data
US 2023/0100792 A1    Mar. 30, 2023

(51) Int. Cl.
*H04L 29/06* (2006.01)
*H04W 4/40* (2018.01)
*H04W 12/106* (2021.01)
*H04W 12/121* (2021.01)

(52) U.S. Cl.
CPC ........... *H04W 12/121* (2021.01); *H04W 4/40* (2018.02); *H04W 12/106* (2021.01)

(58) Field of Classification Search
CPC .... H04W 12/121; H04W 4/40; H04W 12/106
USPC ......................................................... 726/23
See application file for complete search history.

(56) References Cited

U.S. PATENT DOCUMENTS

| 8,726,382 | B2* | 5/2014 | Knapp | H04L 69/22 |
| | | | | 713/168 |
| 10,454,968 | B1* | 10/2019 | Bortz | H04L 63/1441 |
| 11,349,869 | B1* | 5/2022 | Moeck | H04L 63/1483 |
| 11,349,963 | B1* | 5/2022 | Chattopadhyay | H04L 67/01 |
| 2008/0016562 | A1* | 1/2008 | Keeni | H04L 63/1458 |
| | | | | 726/22 |
| 2009/0254970 | A1* | 10/2009 | Agarwal | G06F 21/554 |
| | | | | 726/1 |
| 2013/0058276 | A1* | 3/2013 | Somasundaram | H04L 1/0076 |
| | | | | 370/328 |
| 2019/0052674 | A1* | 2/2019 | Wada | H04L 63/1475 |

(Continued)

FOREIGN PATENT DOCUMENTS

CN        110505134 A     11/2019

OTHER PUBLICATIONS

Koscher, "Experimental security analysis of a modern automobile", 2010, IEEE, pp. 1-15 (Year: 2010).*

(Continued)

*Primary Examiner* — Taghi T Arani
*Assistant Examiner* — Gregory A Lane
(74) *Attorney, Agent, or Firm* — Holland & Hart LLP

(57) ABSTRACT

Methods, systems, and devices for wireless communications are described. A communication device may detect vehicle-to-everything (V2X) fuzzing attacks. The communication device may receive a set of packets. Each packet of the set of packets includes a set of information element (IE) fields. The communication device determine a change to one or more IE fields of the set of IE fields and associated with at least a subset of packets of the set of packets based on comparing a respective value associated with each of the one or more IE fields to a respective default value associated with each of the one or more IE fields. As a result, the communication device may transmit a report indicating a plurality of fuzzing attacks at the communication device.

17 Claims, 10 Drawing Sheets

(56) References Cited

U.S. PATENT DOCUMENTS

| | | | |
|---|---|---|---|
| 2019/0109872 A1* | 4/2019 | Dhakshinamoorthy | ................... G06F 21/577 |
| 2020/0106797 A1* | 4/2020 | Christian | ............ H04L 63/1483 |
| 2020/0274887 A1* | 8/2020 | Zaw | .................... H04L 63/1441 |
| 2020/0314491 A1* | 10/2020 | Rodgers | ................ H04L 41/142 |
| 2021/0203641 A1* | 7/2021 | Mantin | .................. H04L 63/20 |
| 2022/0021689 A1* | 1/2022 | Aoki | ..................... G06N 20/00 |
| 2022/0028903 A1 | 1/2022 | Lee et al. | |
| 2022/0038903 A1* | 2/2022 | Fu | ...................... H04W 12/106 |

OTHER PUBLICATIONS

Al-Jarrah, "Intrusion Detection Systems for Intra-Vehicle Networks: A Review", Feb. 27, 2019, IEEE, vol. 7, pp. 21266-21286 (Year: 2019).*

International Search Report and Written Opinion—PCT/US2022/040730—ISA/EPO—Dec. 7, 2022 (2106678WO).

Koscher K., et al., "Experimental Security Analysis of a Modern Automobile", Security and Privacy (SP), 2010 IEEE Symposium On, IEEE, Piscataway, NJ, USA, May 16, 2010, pp. 447-462, XP031705100, ISBN: 978-1-4244-6894-2, p. 454-p. 458.

Nazakat I., et al., "Intrusion Detection System for In-Vehicular Communication", 2019 15Th International Conference on Emerging Technologies, IEEE, Dec. 2, 2019, 6 Pages, XP033714024, DOI: 10.1109/ICET48972.2019.8994327 [retrieved on Feb. 11, 2020], The whole document.

Song H. M., et al., "Self-Supervised Anomaly Detection for In-Vehicle Network Using Noised Pseudo Normal Data", IEEE Transactions on Vehicular Technology, IEEE, USA, vol. 70, No. 2, Jan. 12, 2021, pp. 1098-1108, XP011841319, ISSN: 0018-9545, DOI:10.1109/TVT.2021.3051026 [retrieved on Mar. 9, 2021] col. 1-col. 12.

\* cited by examiner

TECHNIQUES FOR MISBEHAVIOR DETECTION IN WIRELESS COMMUNICATIONS SYSTEMS

FIELD OF TECHNOLOGY

The following relates to wireless communications, including vehicle-to-everything (V2X) communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the present disclosure relate to enabling a communication device to detect fuzzing attacks. The communication device may be a vehicle capable of wireless communication and may support a system (also referred to as a misbehavior protection system) to detect fuzzing attacks in a wireless communications system, such as a V2X system. The communication device may receive, from another communication device, packets e.g., V2X packets). The communication device may, via a single detector, determine that one or more fields of the packets are malformed based on whether the one or more fields are changing or values of the one or more fields fail to track a model (e.g., a distribution model, or the like). As a result, the communication device may flag an identifier associated with the other communication device (e.g., a medium access control (MAC) address of the other communication device). Additionally or alternatively, the communication device may, via multiple detectors, detect a sequence of attacks and may determine that the sequence of attacks is a fuzzing attack. For example, the communication device may determine that the sequence of attacks is a fuzzing attack based on whether the sequence of attacks follows a pattern associated with the fuzzing attack. The communication device may transmit a single report indicating the sequence of attacks (e.g., evidence for the fuzzing attack) to a network and may track the identifier associated with the other communication device, to refrain, at least temporarily, from receiving other packets.

A method for wireless communication at a device is described. The method may include receiving a set of packets during a time interval, each packet of the set of packets including a set of information element (IE) fields, determining a change to one or more IE fields of the set of IE fields and associated with at least a subset of packets of the set of packets based on comparing a respective value associated with each of the one or more IE fields to a respective default value associated with each of the one or more IE fields, and transmitting a report including an indication of a set of multiple fuzzing attacks at the device based on determining the change to the one or more IE fields of the set of IE fields and associated with the subset of packets of the set of packets.

An apparatus for wireless communication at a device is described. The apparatus may include a processor, memory coupled with the processor, and instructions stored in the memory. The instructions may be executable by the processor to cause the apparatus to receive a set of packets during a time interval, each packet of the set of packets including a set of IE fields, determine a change to one or more IE fields of the set of IE fields and associated with at least a subset of packets of the set of packets based on comparing a respective value associated with each of the one or more IE fields to a respective default value associated with each of the one or more IE fields, and transmit a report including an indication of a set of multiple fuzzing attacks at the device based on determining the change to the one or more IE fields of the set of IE fields and associated with the subset of packets of the set of packets.

Another apparatus for wireless communication at a device is described. The apparatus may include means for receiving a set of packets during a time interval, each packet of the set of packets including a set of IE fields, means for determining a change to one or more IE fields of the set of IE fields and associated with at least a subset of packets of the set of packets based on comparing a respective value associated with each of the one or more IE fields to a respective default value associated with each of the one or more IE fields, and means for transmitting a report including an indication of a set of multiple fuzzing attacks at the device based on determining the change to the one or more IE fields of the set of IE fields and associated with the subset of packets of the set of packets.

A non-transitory computer-readable medium storing code for wireless communication at a device is described. The code may include instructions executable by a processor to receive a set of packets during a time interval, each packet of the set of packets including a set of IE fields, determine a change to one or more IE fields of the set of IE fields and associated with at least a subset of packets of the set of packets based on comparing a respective value associated with each of the one or more IE fields to a respective default value associated with each of the one or more IE fields, and transmit a report including an indication of a set of multiple fuzzing attacks at the device based on determining the change to the one or more IE fields of the set of IE fields and associated with the subset of packets of the set of packets.

In some examples of the method, apparatuses, and non-transitory computer-readable medium described herein, determining the change to the one or more IE fields of the set of IE fields and associated with at least the subset of packets may include operations, features, means, or instructions for determining whether a value of each information field of the one or more IE fields satisfies a threshold value for at least the subset of packets, where the threshold value include the respective default value associated with each of the one or more IE fields.

Some examples of the method, apparatuses, and non-transitory computer-readable medium described herein may further include operations, features, means, or instructions for determining a pattern associated with a fuzzing attack for at least the subset of packets, the pattern indicating an increase or a decrease in the respective value associated with each of the one or more IE fields, where the increase or the decrease in the respective value associated with each of the one or more IE fields may be based on a randomness, the pattern identifying a data type associated with each of the one or more IE fields and where determining the change to the one or more IE fields of the set of IE fields and associated with at least the subset of packets may be based on the pattern associated with the fuzzing attack for at least the subset of packets.

Some examples of the method, apparatuses, and non-transitory computer-readable medium described herein may further include operations, features, means, or instructions for determining the change to the one or more IE fields of the set of IE fields and associated with at least the subset of packets of the set of packets may be based on a machine learning algorithm.

Some examples of the method, apparatuses, and non-transitory computer-readable medium described herein may further include operations, features, means, or instructions for aggregating evidence of a set of multiple misbehaviors based on determining the change to the one or more IE fields of the set of IE fields and associated with at least the subset of packets of the set of packets, each misbehavior of the set of multiple misbehaviors corresponding to an instance of the respective value associated with each of the one or more IE fields differing from the respective default value associated with each of the one or more IE fields, storing the evidence of the set of multiple misbehaviors to detect the set of multiple fuzzing attacks, and transmitting the evidence of the set of multiple misbehaviors to indicate the set of multiple fuzzing attacks at the device.

In some examples of the method, apparatuses, and non-transitory computer-readable medium described herein, the evidence of the set of multiple misbehaviors indicating the set of multiple fuzzing attacks may be transmitted via the report.

In some examples of the method, apparatuses, and non-transitory computer-readable medium described herein, transmitting the report including the indication of the set of multiple fuzzing attacks at the device may include operations, features, means, or instructions for transmitting information associated with at least the subset of packets based on determining the change to the one or more IE fields of the set of IE fields and associated with at least the subset of packets, the information indicating a detected misbehavior for each of at least the subset of packets and a time stamp associated with the detected misbehavior for each of at least the subset of packets.

Some examples of the method, apparatuses, and non-transitory computer-readable medium described herein may further include operations, features, means, or instructions for tracking an identifier associated with a second device that transmits at least the subset of packets based on determining the change to the one or more IE fields associated with at least the subset of packets.

Some examples of the method, apparatuses, and non-transitory computer-readable medium described herein may further include operations, features, means, or instructions for receiving, from a security entity, feedback information based on the report including the indication of the set of multiple fuzzing attacks at the device and monitoring a second set of packets for a second change to a second one or more IE fields of a second set of IE fields and associated with at least a second subset of packets of the second set of packets based on the feedback information.

In some examples of the method, apparatuses, and non-transitory computer-readable medium described herein, the feedback information includes an acknowledgement of the indication of the set of multiple fuzzing attacks at the device.

In some examples of the method, apparatuses, and non-transitory computer-readable medium described herein, the feedback information includes a negative acknowledgement of the indication of the set of multiple fuzzing attacks at the device and the method, apparatuses, and non-transitory computer-readable medium may include further operations, features, means, or instructions for adjusting a detection criteria for fuzzing attacks based on the feedback information including the negative acknowledgement, where monitoring the second set of packets for the change to the second one or more IE fields of the second set of IE fields may be based on the adjusting of the detection criteria for fuzzing attacks.

In some examples of the method, apparatuses, and non-transitory computer-readable medium described herein, the time interval includes a pre-configured time interval or a dynamically configured time interval.

In some examples of the method, apparatuses, and non-transitory computer-readable medium described herein, the device operates within a V2X communications system, and the set of packets include a set of V2X messages.

DETAILED DESCRIPTION

Figure 1:
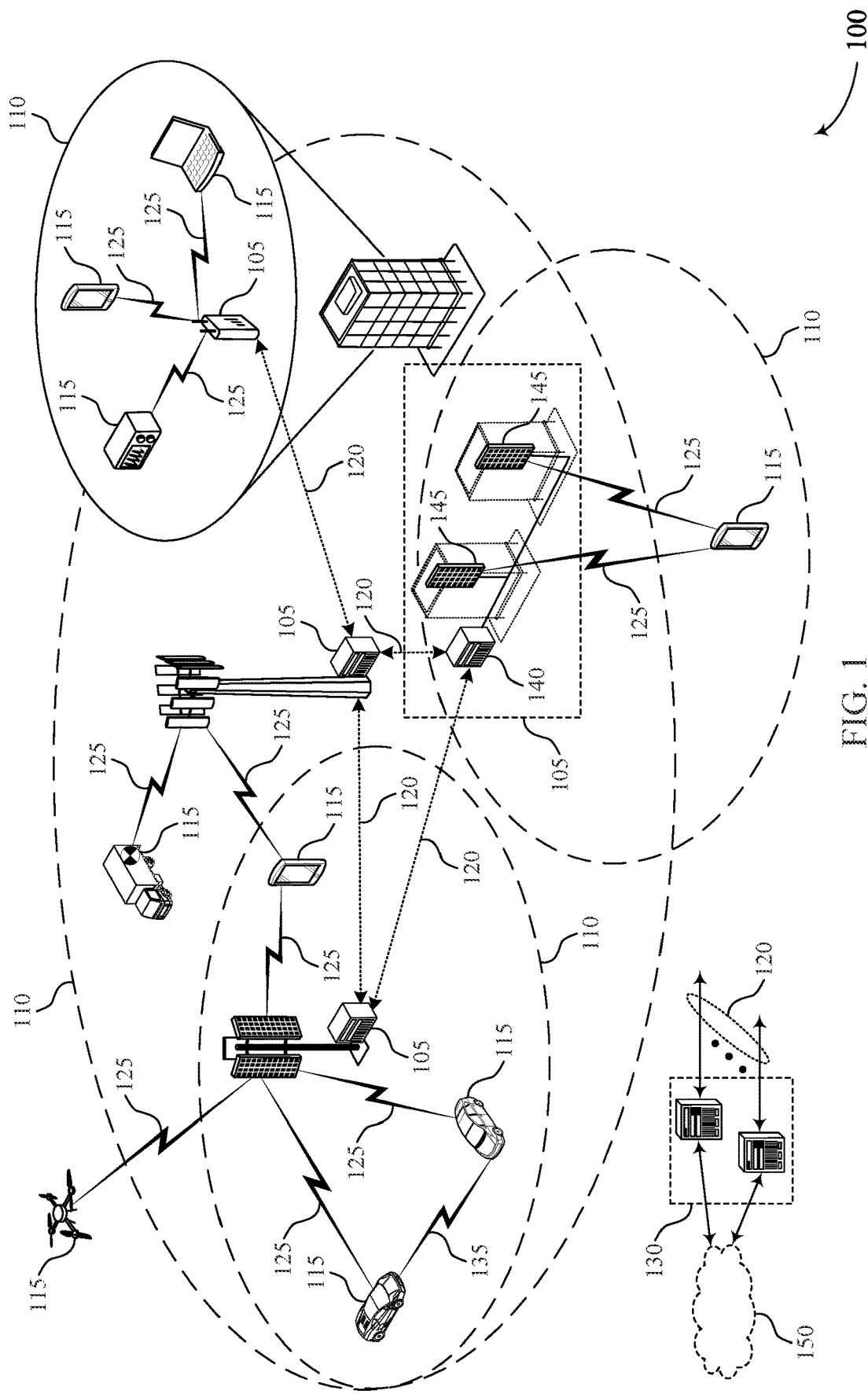
FIGS. 1 and 2 illustrate examples of wireless communications systems that support techniques for misbehavior detection in wireless communications systems in accordance with aspects of the present disclosure.

A communication device may support an intelligent transport system (ITS) protocol stack and, in some cases, the communication device may experience a fuzzing attack. A fuzzing attack may be an attack which includes an aggregation of smaller attacks (e.g., multiple attacks over multiple messages) that are aimed at detecting vulnerabilities in the ITS protocol stack of the communication device. In some cases, the communication device may detect each of the smaller attacks of the aggregated fuzzing attack and may generate a report (e.g., a misbehavior report (MBR)) for each of the smaller attacks. However, such detection of each of the smaller attacks and generation of reports for each of the smaller attacks may result in a blindness or a lack of awareness to the aggregated fuzzing attack. As such, the communication device may fail to detect the fuzzing attack, potentially resulting in an attacker device (e.g., another communication device) identifying (and exploiting) vulnerabilities in the ITS protocol stack of the communication device. Additionally, detecting and generating an MBR for each of the smaller attacks, which may cause the blindness to the aggregated fuzzing attack, may also have consequences for the communication device in terms of memory consumption, computation power, and network resources.

Various aspects of present disclosure relate to enabling a communication device, such as a UE or a security detector of a UE, to analyze variations in content (e.g., misbehaviors) across multiple messages to identify a pattern of evidence based on any such variations in content detected across the multiple messages. In some examples, the pattern of evidence may be associated with a sequence of attacks and be indicative of a fuzzing attack. The communication device may detect multiple different fuzzing attack types (such as a fuzzing attack associated with a random field value, a fuzzing attack associated with random values on multiple fields, a fuzzing attack associated with out-of-range values, a fuzzing attack associated with a wrong data type, a mutation-based fuzzing attack, or evolutionary fuzzing) based on a criterion to identify "fuzzing patterns."

The communication device may analyze misbehaviors across a time interval and, if messages from a unique sender (e.g., another communication device) trigger detection of multiple types of variations in content (e.g., misbehavior types) during the time interval, the communication device may aggregate the evidence and may label an MBR for the multiple types of variations in content as a fuzzing attack. In some other examples, the communication device may use a machine learning algorithm to identify fuzzing patterns over multiple messages during a time interval. Additionally, the communication device may support a feedback mechanism to assist with local detection of unexpected variation in content. For example, the feedback mechanism may provide an indication of whether a detected fuzzing attack is an actual fuzzing attack or multiple individual (e.g., separate and unrelated) attacks, and the communication device may update a detection criterion for fuzzing attacks based on the feedback.

Particular aspects of the subject matter described herein may be implemented to realize one or more of the following advantages. For example, based on generating an MBR including aggregated evidence for a fuzzing attack (e.g., an MBR including information associated with multiple message-level attacks), the communication device may reduce computation and communication overhead, which may provide improvements for the communication device as an on-board unit (OBU). For example, instead of transmitting an MBR for each of the multiple attacks, the communication device may transmit one MBR for the multiple attacks collectively, resulting in fewer MBRs. Additionally, including the aggregated evidence in one MBR may increase a quality of misbehavior reporting. The communication device may also experience greater security and protection from attacks, which may improve a user experience (e.g., for a data consumer) associated with an application of the communication device. For example, when the communication device is at least a part of a vehicle, greater security and protection from attacks may provide greater safety for the user. The communication device may achieve greater accuracy for detection of fuzzing attacks based on employing the feedback mechanism for confirmation or rejection of a detected fuzzing attack.

Aspects of the disclosure are initially described in the context of wireless communications systems. Additionally, aspects of the disclosure are illustrated by and described with reference to a process flow. Aspects of the disclosure are further illustrated by and described with reference to apparatus diagrams, system diagrams, and flowcharts that relate to techniques for misbehavior detection in wireless communications systems.

FIG. 1 illustrates an example of a wireless communications system 100 that supports techniques for misbehavior detection in wireless communications systems in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LIE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UES 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and. $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, a UE 115 (e.g., a device operating or communicating within a V2X communications system, such as a wireless vehicle) may employ a detection system for security and protection of the UE 115 from wireless attacks from one or more other devices (e.g., from one or more other UEs 115, one or more other base stations 105, one or more small cells, or any one or more devices capable of V2X communication). In some implementations, the UE 115 may employ the detection system to analyze multiple messages received during a time interval for misbehaviors, where such misbehaviors may include an unexpected variation of one or more values or data types included in the messages, one or more values included in the messages being outside an expected range of values, or a variation of one or more values in accordance with a known or expected pattern.

For example, the UE 115 may receive a set of packets, each packet of the set of packets including a set of IE fields, and may determine or detect a change (e.g., a misbehavior) to one or more IE fields of the set of IE fields and associated with at least a subset of the set of packets. In some examples, the UE 115 may detect the change based on comparing a respective value associated with each of the one or more IE fields to a respective default value (e.g., an expected value or a value that would avoid triggering misbehavior detection) associated with each of the one or more IE fields. In some aspects, the respective default value associated with each of the one or more IE fields may include or refer to a value that follows a distribution or model of values that the UE 115 expects for the one or more IE fields. As such, such a distribution or model may be referred to herein as a trained distribution or a constraint model. If the UE 115 determines that the change to the one or more IEs and associated with at least the subset of packets is associated with a fuzzing attack, the UE 115 may generate an MBR including information associated with the change to the one or more IEs (e.g., information associated with the misbehaviors detected for the one or more IEs in at least the subset of packets) and may transmit the MBR to a network entity.

Figure 2:
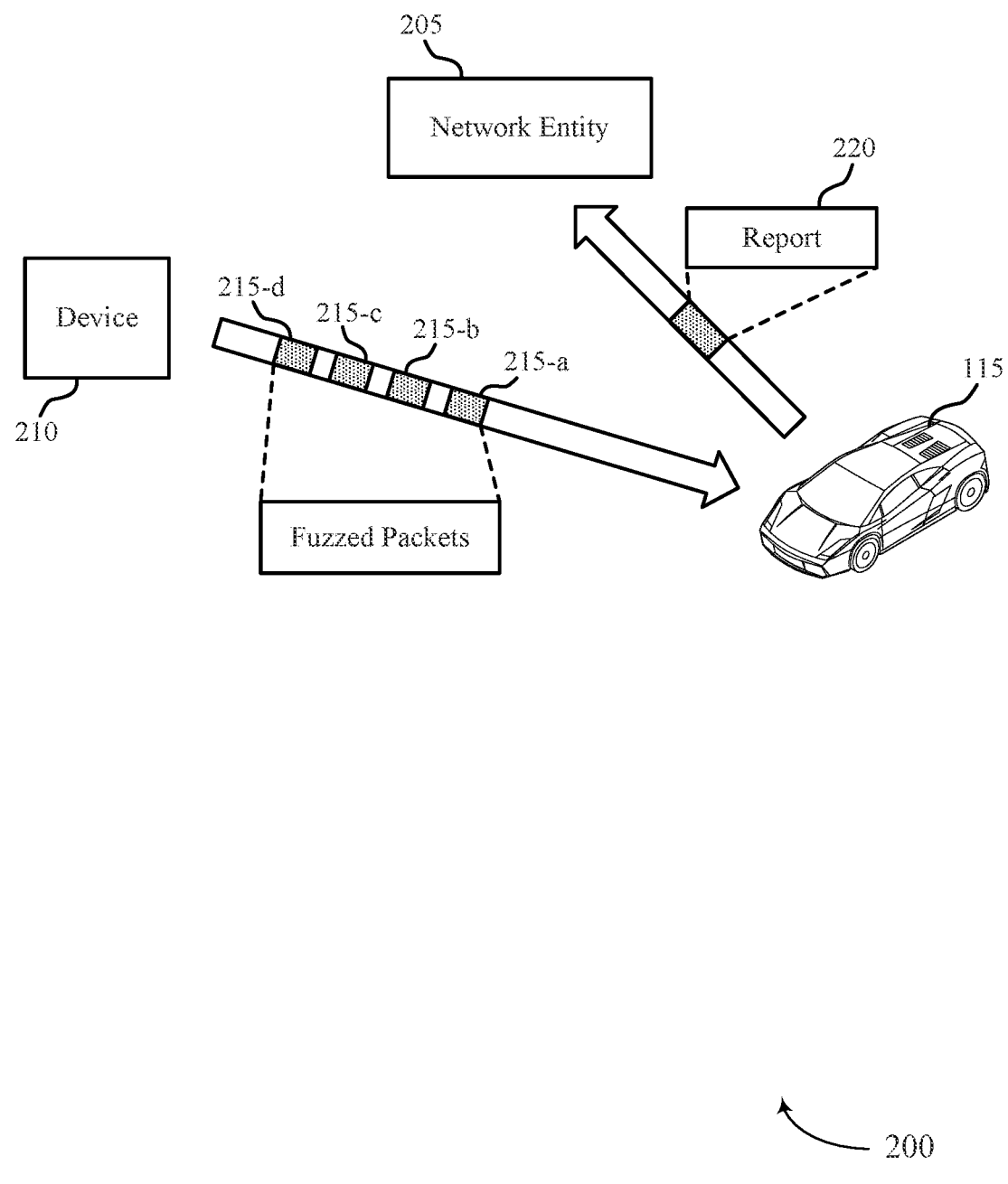

FIG. 2 illustrates an example of a wireless communication system 200 that supports techniques for misbehavior detection in wireless communications systems in accordance with aspects of the present disclosure. The wireless communications system 200 may implement or be implemented to realize one or more aspects of the wireless communications system 100. For example, the wireless communications system 200 illustrates communication between a UE 115, a network entity 205, and a device 210. In some examples, the UE 115 (or one or more components of the UE 115) may receive a set of packets 215 from the device 210 and may analyze the set of packets for a fuzzing attack based on aggregating evidence of various misbehaviors associated with the set of packets 215.

For example, the UE 115 may support an ITS stack and, in some cases, an attacker (e.g., the device 210) may fuzz fields IE fields) of each if not all of a number of V2X messages to identify flaws in the ITS stack (e.g., flaws in ITS applications or security level) implementation. In some cases, attacks in V2X communications systems may be considered as or include radio jamming attacks or application-layer misbehavior. In some aspects, such application-layer misbehavior may be associated with one or more V2X messages, such as basic safety messages (BSMs). Fuzzing attacks, on the other hand, may be a de facto offensive technique according to which an attacker may find weakness in implementation of the UE 115 and obtain escalated privileges. In some cases, one or more detectors of the UE 115 may look at one V2X message (e.g., one BSM message) or a relatively short series of V2X messages (e.g., a relatively short series of BSMs), such as three V2X messages, if monitoring for misbehaviors or attacks. Such a monitoring window for analysis of one or a relatively short series of V2X messages, however, may be too small to detect fuzzing attacks.

A fuzzing attack may be seen or understood as an aggregation of attacks, each attack of the aggregation of attacks aiming to detect one or more vulnerabilities in the ITS stack implementation of the UE 115. Some V2X misbehavior detection systems may be able to detect individual "steps" of the fuzzing attack due to their focus on one V2X message or a relatively short series of V2X messages, but may be unable to detect the overall fuzzing attack. For example, some V2X misbehavior detection systems may generate an MBR for each step of a larger fuzzing attack, which may include storing data, encrypting, and sending a relatively large number of MBRs to a misbehavior authority (e.g., the network entity 205). In other words, some V2X misbehavior detectors may analyze a V2X message to identify wrong data through one or both of a plausibility check or an inconsistency check. Accordingly, such V2X misbehavior detectors would likely detect "steps" of the fuzzing attack but not the overall attack.

Further, a fuzzing attack may be part of a kill chain (e.g., reconnaissance or reverse engineering) and may be an early indicator of a future attack if detected. V2X misbehavior detection systems that generate an MBR for each step or each attack, however, may miss detection of the larger fuzzing attack. In other words, generation of an MBR for each detected attack per message or per short series of messages may result in a blindness to or lack of awareness of a fuzzing attack.

In some cases, an attacker (e.g., such as the device 210) may use a software-defined radio to perform a V2X fuzzing attack in order to test a quality of the implementation of the ITS stack and find vulnerabilities. In such cases, the attacker may fuzz each if not all of a number of V2X message fields (e.g., IE fields) or each if not all of a number of V2X message security header fields of one or more generated messages and may send the one or more generated messages to a target (e.g., the UE 115). The target (e.g., a V2X receiver, such as the UE 115) may analyze the messages received from the attacker and, in some implementations, may flag a fuzzing attack and block the attacker. In some aspects, the target may block the attacker based on blocking a sender ID, one or more MAC addresses associated with the attacker, or a digital signature or certificate associated with the attacker.

For example, in some implementations, the UE 115 may employ a detector as part of misbehavior protection system that is able to detect V2X fuzzing attacks. In some aspects, the detector may run locally on the UE 115. The UE 115, using the detector, may capture, collect, or otherwise obtain a number of malformed messages (e.g., such as V2X messages or packets 215) from a single sender ID or MAC address (or digital signature or certificate), identify which one or more fields (e.g., IE fields) of the malformed messages are malformed themselves, observe that the fields are changing or that values of the fields do not follow a (trained) distribution or one or more constraint models, and may flag the sender ID, the MAC address, or the digital signature or certificate as misbehaving.

In some implementations, the detector may leverage other detectors of the misbehavior detection system to identify a chain of attacks and may label the attack (e.g., the chain of attacks) as fuzzing if the attack satisfies or is associated with a fuzzing pattern. For example, the detector may follow or employ a set of rules or techniques to detect fuzzing patterns across multiple packets 215. As such, the detector may assist in generating more complete or richer evidence for misbehavior investigation and may also support fewer MBRs (e.g., because one MBR may include information for multiple detected misbehaviors), which may be associated with or lead to better quality and less overhead. Further, a detection of fuzzing attacks may help with some deployment scenarios or use cases, including for taking preventive measures such as moving target defense approaches.

In other words, the UE 115, using the detector, may detect multiple V2X fuzzing attack types (e.g., random field value, random values on multiple fields, out-of-range values, wrong data type, mutation-based, or evolutionary fuzzing) based on analyzing the misbehavior detected across multiple messages (e.g., multiple packets 215). Further, although described herein as being implemented by the UE 115 on a receiving end, an attacker (e.g., the device 210) may also implement fuzzing detection on the send-side, before transmission. Additionally, such a misbehavior detection system that can detect fuzzing attacks may provide more added value based on or as a result of labelling the type of misbehavior detected. For example, in some implementations, the UE 115 may use the misbehavior detection system to label an MBR with "fuzzing attack."

The UE 115 may employ a set of rules or techniques to identify fuzzing patterns. Such techniques may look at or focus on misbehaviors or variations in content of messages (e.g., packets 215) across a predefined or dynamic time window. For example, the UE 115 may perform a first detection technique and may observe that a unique sender's messages trigger multiple misbehavior types across the time window (e.g., across a time window of a number of V2X messages, such as 20 V2X messages). In such examples, the detector may aggregate evidence (e.g., BSMs, a list of detectors, or types of fuzzing) and may generate an MBR labeled as fuzzing including the aggregated evidence if the UE 115 detects that the aggregated evidence is associated with a fuzzing attack.

For example, the UE 115 may analyze the aggregated evidence (e.g., aggregated misbehaviors or errors identified across multiple messages over a time window) and, as part of the analysis, may look for patterns associated with the evidence, a common misbehavior occurring across the multiple messages, a specific variation of misbehaviors occurring across multiple fields of the multiple messages, a size of transmitted messages (e.g., a number of bytes of the messages), or any combination thereof. The detection criteria that the UE 115 employs may be specified (e.g., in a standard) or may be configured at the UE 115 (e.g., via signaling or by a manufacturer). In some other examples, the UE 115 may perform a second detection technique and may use machine learning to detect a fuzzing attack. In such examples, the UE 115 may use the machine learning algorithm (which may be trained offline or online, such as via a feedback mechanism) to analyze misbehaviors across multiple messages and the machine learning algorithm may output an MBR labelled as fuzzing or otherwise indicate that the UE 115 may classify a sequence of attacks as a fuzzing attack and that the UE 115 may generate a single MBR for the sequence of attacks. In some aspects, machine learning algorithms may be effective at detecting evolutionary or mutation-based fuzzing.

As described herein, creating a chain of evidence or a chain of attacks and including the chain of evidence or the chain of attacks in one MBR may assist in reducing a number of MBRs generated and may support a sending of reports that reflect, more accurately, the attacks observed by the UE 115. Likewise, the UE 115 may experience reduced communication overhead to a misbehavior authority (e.g., the network entity 205), facilitate the misbehavior authority's investigation, improve local MBR management, or help in identifying an early stage of an attack. Moreover, each MBR generated by the UE 115 may be signed and encrypted on the OBU. Thus, minimizing the amount of MBR generations may lead to computation savings.

For example, if the device 210 functions as an attacker device and fuzzes a set of packets 215 as part of a V2X fuzzing attack associated with targeting one field of the set of packets 215, the device 210 may generate the packets 215 including various values for the targeted field that are different than an expected value or outside an expected range of values for that targeted field, where one or both of the expected value or the expected range of values may be referred to or understood as a default value for the targeted field. In some examples, such as in examples in which the packets 215 sent by the device 210 are BSMs, the packets 215 may include an identifier field (e.g., a TempID field), a speed field, an acceleration field, or a brake status field (e.g., a brakeStatus field).

In such examples, the device 210 may generate a packet 215-a (e.g., which may be an example of or may be referred to as a BSM_0) and may transmit the packet 215-a at a first time instance (e.g., at T=0). In some aspects, the packet 215-a may include values of (TempID=1, speed=55, acceleration=1.22, brakeStatus=00000). The UE 115 may receive the packet 215-a, may not detect any misbehaviors associated with the packet 215-a, and may lack a misbehavior protection system output (e.g., an AMPS output). In other words, AMPS output: N/A.

As part of the fuzzing attack, the device 210 may generate a packet 215-b (e.g., which may be an example of or may be referred to as a BSM_1) and may transmit the packet 215-b at a second time instance (e.g., at T=1). In some aspects, the packet 215-b may include values of (TempID=1, speed=-10, acceleration=1.22, brakeStatus=00000). The UE 115 may receive the packet 215-b, may detect a misbehavior associated with the packet 215-b at the "speed" field, and may have a misbehavior protection system output (e.g., an AMPS output) of "implausible speed." In other words, AMPS output: implausible speed. The UE 115 may generate a first $MBR_{1,1}$ based on the detected misbehavior and, in some implementations, may refrain from sending the first $MBR_{1,1}$. Instead, the UE 115 may store the first $MBR_{1,1}$ as part of an attempt to detect a fuzzing attack across the multiple packets 215 sent from the device 210.

The device 210 may also generate a packet 215-c (e.g, which may be an example of or may be referred to as a BSM_2) and may transmit the packet 215-c at a third time instance (e.g., at T=2). In some aspects, the packet 215-c may include values of (TempID=1, speed=2000, acceleration=1.22, brakeStatus=00000). The UE 115 may receive the packet 215-c, may detect a misbehavior associated with the packet 215-c at the "speed" field, and may have a misbehavior protection system output (e.g., an AMPS output) of "implausible speed." In other words, AMPS output: implausible speed. The UE 115 may generate a second $MBR_{1,2}$ based on the detected misbehavior and, in some implementations, may refrain from sending the second $MBR_{1,2}$. Instead, the UE 115 may store the second $MBR_{1,2}$, along with the first $MBR_{1,1}$, as part of an attempt to detect a fuzzing attack across the multiple packets 215 sent from the device 210. For example, the UE 115 may aggregate the first $MBR_{1,1}$ and the second $MBR_{1,2}$ to aggregate a chain of evidence of attacks from the device 210.

The device 210 may also generate a packet 215-d (e.g., which may be an example of or may be referred to as a BSM_3) and may transmit the packet 215-d at a fourth time instance (e.g., at T=3). In some aspects, the packet 215-d may include values of (TempID=1, speed=0xAF, acceleration=1.22, brakeStatus=00000). The UE 115 may receive the packet 215-d, may detect a misbehavior associated with the packet 215-d at the "speed" field, and may have a misbehavior protection system output (e.g., an AMPS output) of "wrong data type speed." In other words, AMPS output: wrong data type speed. The UE 115 may generate a third $MBR_{1,3}$ based on the detected misbehavior and, in some implementations, may refrain from sending the third $MBR_{1,3}$. Instead, the UE 115 may store the third $MBR_{1,3}$, along with the first $MBR_{1,2}$ and the second $MBR_{1,2}$, as part of an attempt to detect a fuzzing attack across the multiple packets 215 sent from the device 210. For example, the UE 115 may aggregate the first $MBR_{1,1}$, and the second $MBR_{1,2}$, and the third $MBR_{1,3}$ to aggregate a chain of evidence of attacks from the device 210.

The UE 115 may analyze the detected misbehaviors across the packets 215 (e.g., a set of incoming V2X messages), in aggregate or collectively, to determine whether the device 210 is attempting a fuzzing attack on the UE 115 using the packets 215. In some implementations, the UE 115 may detect that the changing values of the "speed" field differ from expected values, differ from an expected range of values, differ from an expected distribution of values, or differ from a constraint model associated with values of the "speed" field (e.g., differ from a respective default value for the "speed" field). In such implementations, the UE 115 may aggregate the evidence of the various misbehaviors and include the evidence in a single report 220 (such as the first $MBR_{1,1}$), may label or flag the single report 220 as fuzzing, and may transmit the report 220 to the network entity 205. As such, the report 220 may include a chain of attacks and evidence identifying the detected fuzzing attack from the device 210.

In some implementations, and as shown in FIG. 2, the UE 115 may transmit the report 220 to the network entity 205. In some aspects, the network entity 205 may be associated with an original equipment manufacturer (OEM), such as a car manufacturer, a server, or a misbehavior authority. The wireless communications system 200 may support a public key infrastructure (PKI) and an overall set of components or servers may issue certificates or other cryptographic material that devices may use to authenticate messages or encrypt messages and the misbehavior authority may receive the report 220 using any such information for authenticating or decrypting the report 220. Additionally or alternatively, the UE 115 may transmit the report 220 to road-side unit (RSU) or to one or more other UEs 115 (e.g., to one or more other vehicles).

For any number of packets 215 that are generated with fuzzing (e.g., as part of a fuzzing attack), the UE 115 may flag the packets 215, log information (e.g., misbehaviors) associated with the packets 215, or may block any additional packets 215 from a same sender. Further, a modem of the UE 115 may receive a notification to discard packets 215 sent from the identified sender (e.g., the device 210), and such a notification may be signaled via an application programming interface (API) call at the model level.

The UE 115 may use the detector to detect fuzzing attacks at any layer of the stack (e.g., the ITS stack). For example, some implementations are described in the context of performing the detection at the application layer, but fuzzing (and fuzzing detection) may also occur at Layer 2 (L2) as well. Fuzzing (and fuzzing detection) may use a similar approach for a lower layer, such as Layer 1 (L1) as well. Further, the described fuzzing detector may not prevent a "blocklist" approach such that the use of the detector for detecting fuzzing attacks may have little effect (e.g., no effect) on real-time protection. In some aspects, the UE 115 may store a blocklist locally and may update the blocklist with an ID associated with the device 210 if the UE 115 detects that the device 210 is an attacking device. In such aspects, the UE 115 may block or ignore messages associated with the blocked ID for a time duration. In some examples, the time duration may be defined by periodicity associated with a reception of an updated blocklist from a network entity, such as a PKI infrastructure revocation list. As such, lists of blocked IDs may be shared among various devices within the wireless communications system 200. Additionally or alternatively, the UE 115 may block or ignore messages associated with the blocked ID for a specified or configured time duration, such as five seconds, one day, etc.

In some implementations, the UE 115 may feature an optional feedback mechanism. The feedback mechanism may include a supporting infrastructure, such as a security operation center (e.g., a security entity), in which an operator can confirm or reject a detection of a fuzzing attack at the UE 115. Such a feedback mechanism may assist the local misbehavior detection system to improve an accuracy of fuzzing attack detection. For instance, a local misbehavior detection system may report a set of malicious packets 215 (which may be examples of V2X messages, such as BSMs) as a fuzzing attack to a security entity (e.g., the security operation center) and the security entity may analyze the detection of the fuzzing attack. In some examples, for instance, the security entity may determine, after analysis, that the malicious packets 215 are separate, individual attacks (e.g., unrelated attacks or errors) and are not associated with a fuzzing attack. The security entity may send feedback to the reporting local misbehavior detection system (e.g., the UE 115) and the UE 115 may update its detection criteria for fuzzing attacks based on the feedback. In some aspects, the feedback may include the reported set of malicious packets 215 and a correct classification of the attacks.

Further, the UE 115 may perform various operations in scenarios in which the UE 115 aggregates the packets 215 and detects that the device 210 is not performing a fuzzing attack on the UE 115 or that the packets 215 are otherwise not associated with a fuzzing attack. For example, upon detecting that an aggregated chain of evidence or attacks is not associated with a fuzzing attack, the UE 115 may either transmit a single MBR including information associated with the aggregated chain of evidence or attacks or may transmit individual MBRs for each of the detected attacks. As such, the UE 115 may report each of the aggregated attacks collectively even if the aggregated attacks prove to be unrelated or otherwise not associated with a fuzzing attack or may transmit a separate report for each of the aggregated attacks if the aggregated attacks prove to be unrelated or otherwise not associated with a fuzzing attack.

Figure 3:
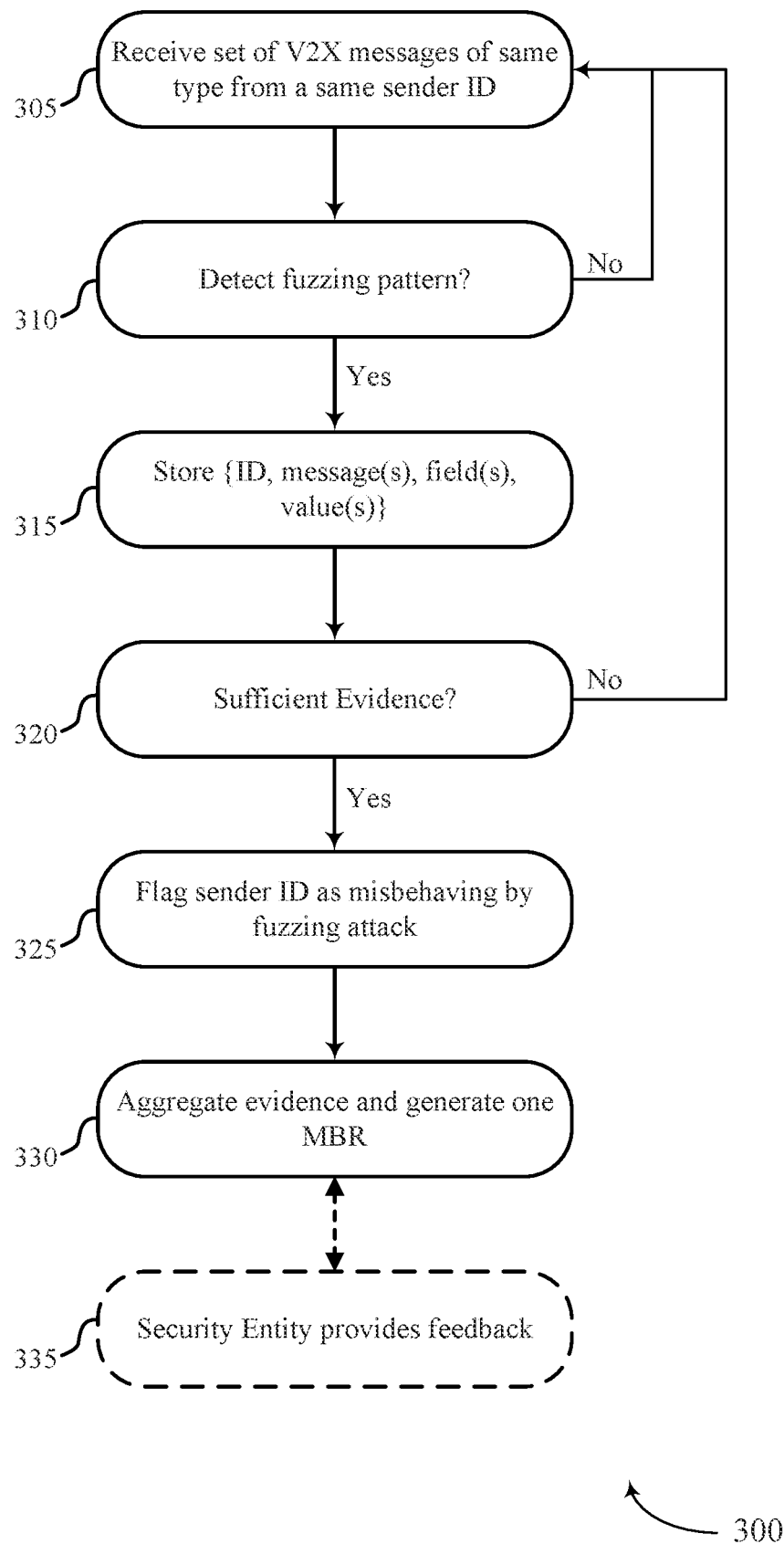
FIG. 3 illustrates an example of a process flow that supports techniques for misbehavior detection in wireless communications systems in accordance with aspects of the present disclosure.

FIG. 3 illustrates an example of a process flow 300 that supports techniques for misbehavior detection in wireless communications systems in accordance with aspects of the present disclosure. The process flow 300 may implement or be implemented to realize aspects of the wireless communications system 100 or the wireless communications system 200. For example, the process flow 300 may illustrate operations at a device, such as a UE 115, that employs a misbehavior detection system capable of analyzing multiple V2X messages, such as sidelink data packets or BSMs, to monitor for a fuzzing attack at the device. For example, the device may implement the process flow 300 as part of an automotive cybersecurity protocol or procedure at a cellular V2X (C-.V2X) module of the device.

In the following description of the process flow 300, the operations may be performed (such as reported or provided) in a different order than the order shown, or the operations performed by the example device may be performed in different orders or at different times. Some operations also may be omitted from the process flow 300, or other operations may be added to the process flow 300. Although some operations or signaling may be shown to occur at different times for discussion purposes, these operations may occur at the same time or otherwise concurrently.

At 305, the device may receive a set of V2X messages of a same type from a same sender ID. For example, the device may receive a set of packets and each packet may include a set of IE fields. At 310, the device may analyze the set of V2X messages and attempt to detect a fuzzing pattern (e.g., a pattern of misbehaviors associated with a fuzzing attack) associated with at least a subset of the set of V2X messages. In some examples, the device may attempt to detect the fuzzing pattern based on comparing values of one or more IE fields of the set of packets to respective default values associated with the one or more IE fields, where such respective default values may be defined by a (trained) distribution or constraint model, among other examples. If the device does not detect a fuzzing pattern, the device may receive a next set of V2X messages for analysis for a fuzzing attack. If the device detects a fuzzing pattern, the device may store information associated with at least the subset of V2X messages over which the device detects the fuzzing pattern.

At 315, the device may store the sender ID and one or more messages, fields, or values associated with at least the subset of V2X messages over which the device detects the fuzzing pattern. At 320, the device may determine whether the device has aggregated sufficient evidence of a fuzzing attack. If the device determines that the device has not aggregated or collected sufficient evidence of a fuzzing attack, the device may receive a next set of V2X messages for analysis for a fuzzing attack. At 325, and if the device determines that the device has aggregated sufficient evidence of a fuzzing attack, the device may flag the sender ID as misbehaving by fuzzing attack. At 330, the device may aggregate the evidence of the fuzzing attack and may generate one MBR for the aggregated evidence of the fuzzing attack.

At 335, the device may communicate signaling with a security entity, such as a security operation center, associated with the detection of the fuzzing attack, the evidence for the fuzzing attack, and feedback confirming or rejection the detection of the fuzzing attack by the device. For example, the device may transmit the evidence for the fuzzing attack to the security entity, the security entity (e.g., an operator of the security entity) may analyze the evidence for the fuzzing attack, and the security entity may transmit feedback to the device either confirming the detection of the fuzzing attack or rejecting the detection of the fuzzing attack. In other words, the security entity may be an example of or associated with a security infrastructure (e.g., a security operation center) and may provide feedback, such as an acknowledgement (ACK) or a negative ACK (NACK) to the device relating to a candidate detection of a fuzzing attack.

Figure 4:
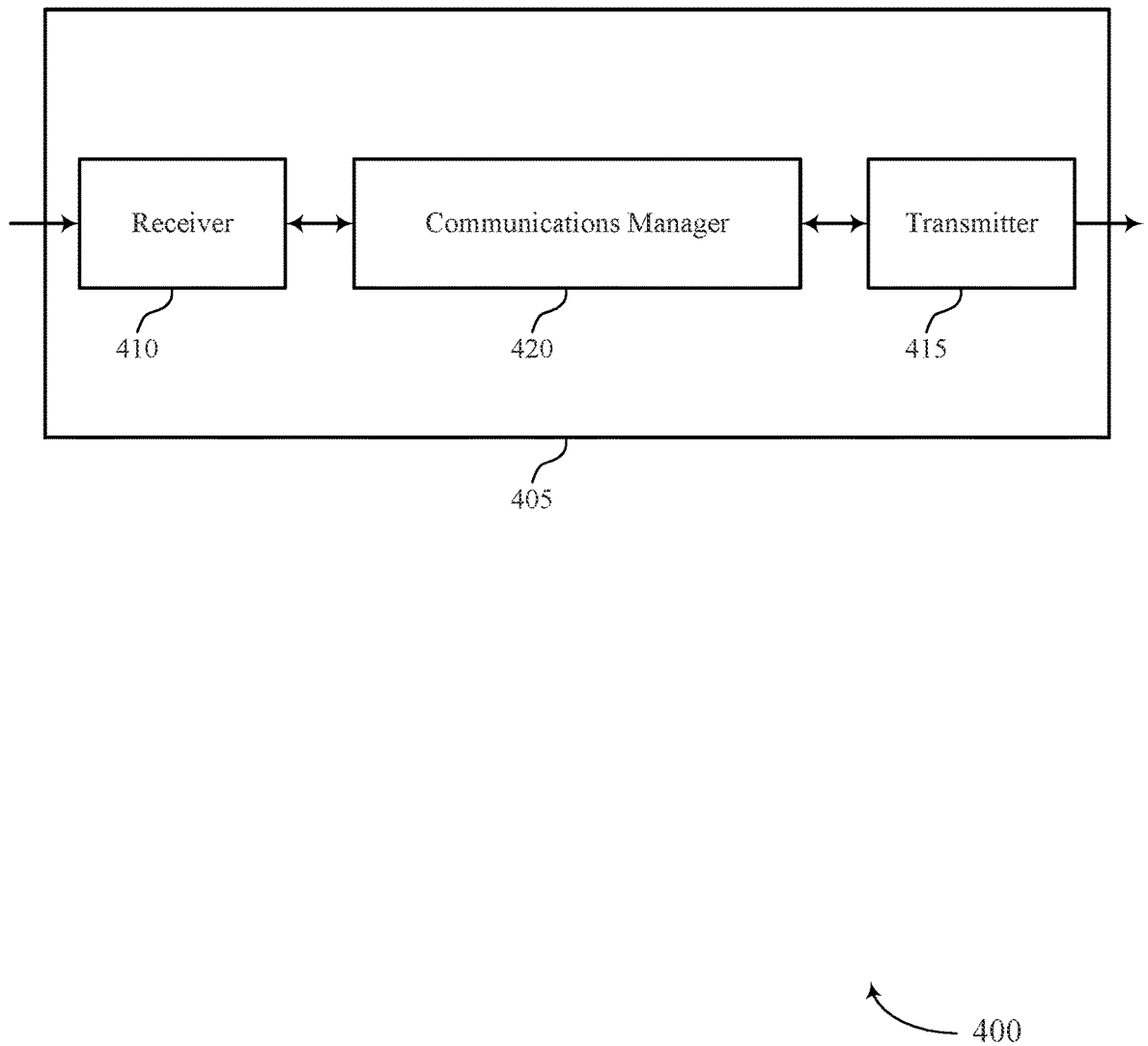
FIGS. 4 and 5 show block diagrams of devices that support techniques for misbehavior detection in wireless communications systems in accordance with aspects of the present disclosure.

FIG. 4 shows a block diagram 400 of a device 405 that supports techniques for misbehavior detection in wireless communications systems in accordance with aspects of the present disclosure. The device 405 may be an example of aspects of a UE 115 as described herein. The device 405 may include a receiver 410, a transmitter 415, and a communications manager 420. The device 405 also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for misbehavior detection in wireless communications systems). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for misbehavior detection in wireless communications systems). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for misbehavior detection in wireless communications systems as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at the device 405 in accordance with examples as disclosed herein. For example, the communications manager 420 may be configured as or otherwise support a means for receiving a set of packets during a time interval, each packet of the set of packets including a set of IE fields. The communications manager 420 may be configured as or otherwise support a means for determining a change to one or more IE fields of the set of IE fields and associated with at least a subset of packets of the set of packets based on comparing a respective value associated with each of the one or more IE fields to a respective default value associated with each of the one or more IE fields. The communications manager 420 may be configured as or otherwise support a means for transmitting a report including an indication of a set of multiple fuzzing attacks at the device 405 based on determining the change to the one or more IE fields of the set of IE fields and associated with the subset of packets of the set of packets.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced processing, reduced power consumption, more efficient utilization of communication resources, more secure communication and operation, and greater user safety.

Figure 5:
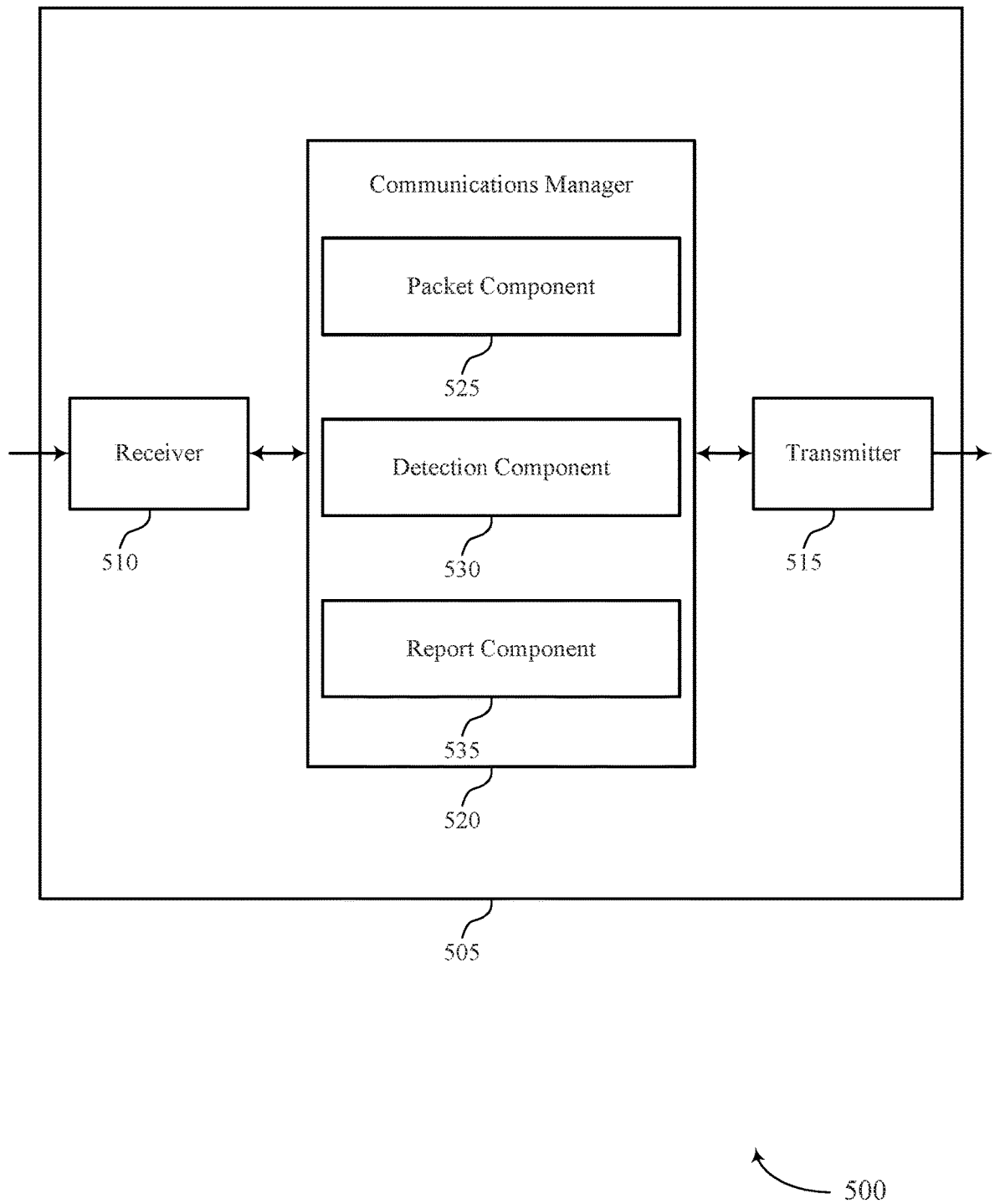

FIG. 5 shows a block diagram 500 of a device 505 that supports techniques for misbehavior detection in wireless communications systems in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses)

The receiver 510 may provide a means for receiving information such as packets, user data, control information, or any combination thereof associated with various information channels (e.g., control channels, data channels, information channels related to techniques for misbehavior detection in wireless communications systems). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for misbehavior detection in wireless communications systems). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for misbehavior detection in wireless communications systems as described herein. For example, the communications manager 520 may include a packet component 525, a detection component 530, a report component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at the device 505 in accordance with examples as disclosed herein. The packet component 525 may be configured as or otherwise support a means for receiving a set of packets during a time interval, each packet of the set of packets including a set of IE fields. The detection component 530 may be configured as or otherwise support a means for determining a change to one or more IE fields of the set of IE fields and associated with at least a subset of packets of the set of packets based on comparing a respective value associated with each of the one or more IE fields to a respective default value associated with each of the one or more IE fields. The report component 535 may be configured as or otherwise support a means for transmitting a report including an indication of a set of multiple fuzzing attacks at the device 505 based on determining the change to the one or more IE fields of the set of IE fields and associated with the subset of packets of the set of packets.

Figure 6:
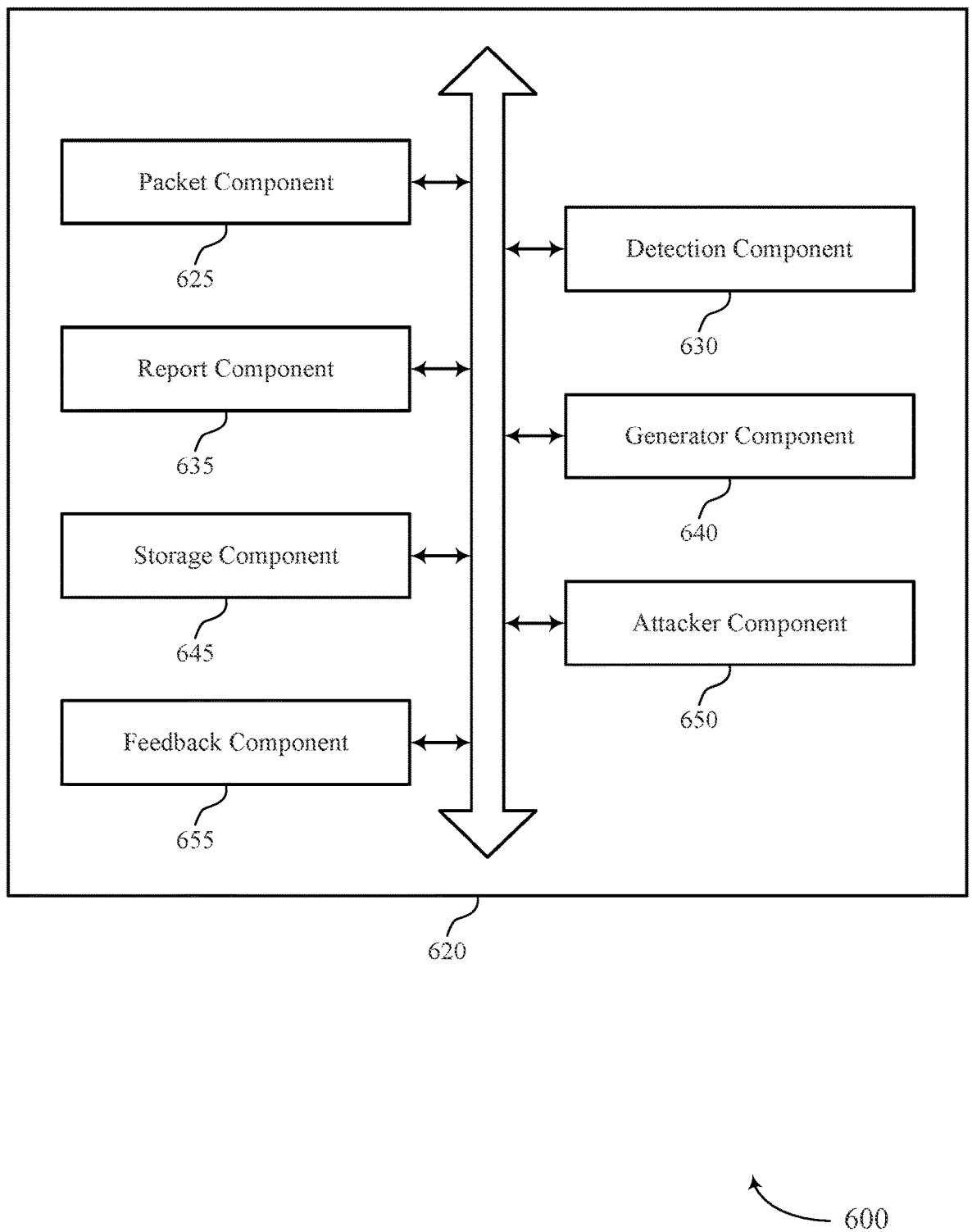
FIG. 6 shows a block diagram of a communications manager that supports techniques for misbehavior detection in wireless communications systems in accordance with aspects of the present disclosure.

FIG. 6 shows a block diagram 600 of a communications manager 620 that supports techniques for misbehavior detection in wireless communications systems in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for misbehavior detection in wireless communications systems as described herein. For example, the communications manager 620 may include a packet component 625, a detection component 630, a report component 635, a generator component 640, a storage component 645, an attacker component 650, a feedback component 655, or any combination thereof. Each of these components may communicate, directly or indirectly, with one another (e.g., via one or more buses).

The communications manager 620 may support wireless communication at a device in accordance with examples as disclosed herein. The packet component 625 may be configured as or otherwise support a means for receiving a set of packets during a time interval, each packet of the set of packets including a set of IE fields. The detection component 630 may be configured as or otherwise support a means for determining a change to one or more IE fields of the set of IE fields and associated with at least a subset of packets of the set of packets based on comparing a respective value associated with each of the one or more IE fields to a respective default value associated with each of the one or more IE fields. The report component 635 may be configured as or otherwise support a means for transmitting a report including an indication of a set of multiple fuzzing attacks at the device based on determining the change to the one or more IE fields of the set of IE fields and associated with the subset of packets of the set of packets.

In some examples, to support determining the change to the one or more IE fields of the set of IE fields and associated with at least the subset of packets, the detection component 630 may be configured as or otherwise support a means for determining whether a value of each information field of the one or more IE fields satisfies a threshold value for at least the subset of packets. In some examples, the threshold value includes the respective default value associated with each of the one or more IE fields.

In some examples, the detection component 630 may be configured as or otherwise support a means for determining a pattern associated with a fuzzing attack for at least the subset of packets, the pattern indicating an increase or a decrease in the respective value associated with each of the one or more IE fields. In some examples, the increase or the decrease in the respective value associated with each of the one or more IE fields is based on a randomness. In some examples, the pattern identifying a data type associated with each of the one or more IE fields. In some examples, the detection component 630 may be configured as or otherwise support a means for determining the change to the one or more IE fields of the set of IE fields and associated with at least the subset of packets based on the pattern associated with the fuzzing attack for at least the subset of packets.

In some examples, determining the change to the one or more IE fields of the set of IE fields and associated with at least the subset of packets of the set of packets is based on a machine learning algorithm. In some examples, the generator component 640 may be configured as or otherwise support a means for aggregating evidence of a set of multiple misbehaviors based on determining the change to the one or more IE fields of the set of IE fields and associated with at least the subset of packets of the set of packets. In some examples, each misbehavior of the set of multiple misbehaviors corresponds to an instance of the respective value associated with each of the one or more IE fields differing from the respective default value associated with each of the one or more IE fields. In some examples, the storage component 645 may be configured as or otherwise support a means for storing the evidence of the set of multiple misbehaviors to detect the set of multiple fuzzing attacks. In some examples, the report component 635 may be configured as or otherwise support a means for transmitting the evidence of the set of multiple misbehaviors to indicate the set of multiple fuzzing attacks at the device.

In some examples, the evidence of the set of multiple misbehaviors indicating the set of multiple fuzzing attacks is transmitted via the report. In some examples, to support transmitting the report including the indication of the set of multiple fuzzing attacks at the device, the report component 635 may be configured as or otherwise support a means for transmitting information associated with at least the subset of packets based on determining the change to the one or more IE fields of the set of IE fields and associated with at least the subset of packets. In some examples, the information indicating a detected misbehavior for each of at least the subset of packets and a time stamp associated with the detected misbehavior for each of at least the subset of packets.

In some examples, the attacker component 650 may be configured as or otherwise support a means for tracking an identifier associated with a second device that transmits at least the subset of packets based on determining the change to the one or more IE fields associated with at least the subset of packets. In some examples, the feedback component 655 may be configured as or otherwise support a means for receiving, from a security entity, feedback information based on the report including the indication of the set of multiple fuzzing attacks at the device. In some examples, the detection component 630 may be configured as or otherwise support a means for monitoring a second set of packets for a second change to a second one or more IE fields of a second set of IE fields and associated with at least a second subset of packets of the second set of packets based on the feedback information.

In some examples, the feedback information includes an ACK of the indication of the set of multiple fuzzing attacks at the device. In some examples, the feedback information includes a NACK of the indication of the set of multiple fuzzing attacks at the device, and the detection component 630 may be configured as or otherwise support a means for adjusting a detection criteria for fuzzing attacks based on the feedback information including the NACK. In some examples, monitoring the second set of packets for the change to the second one or more IE fields of the second set of IE fields is based on the adjusting of the detection criteria for the fuzzing attacks. In some examples, the time interval includes a pre-configured time interval or a dynamically configured time interval. In some examples, the device operates within a V2X communications system. In some examples, the set of packets include a set of V2X messages.

Figure 7:
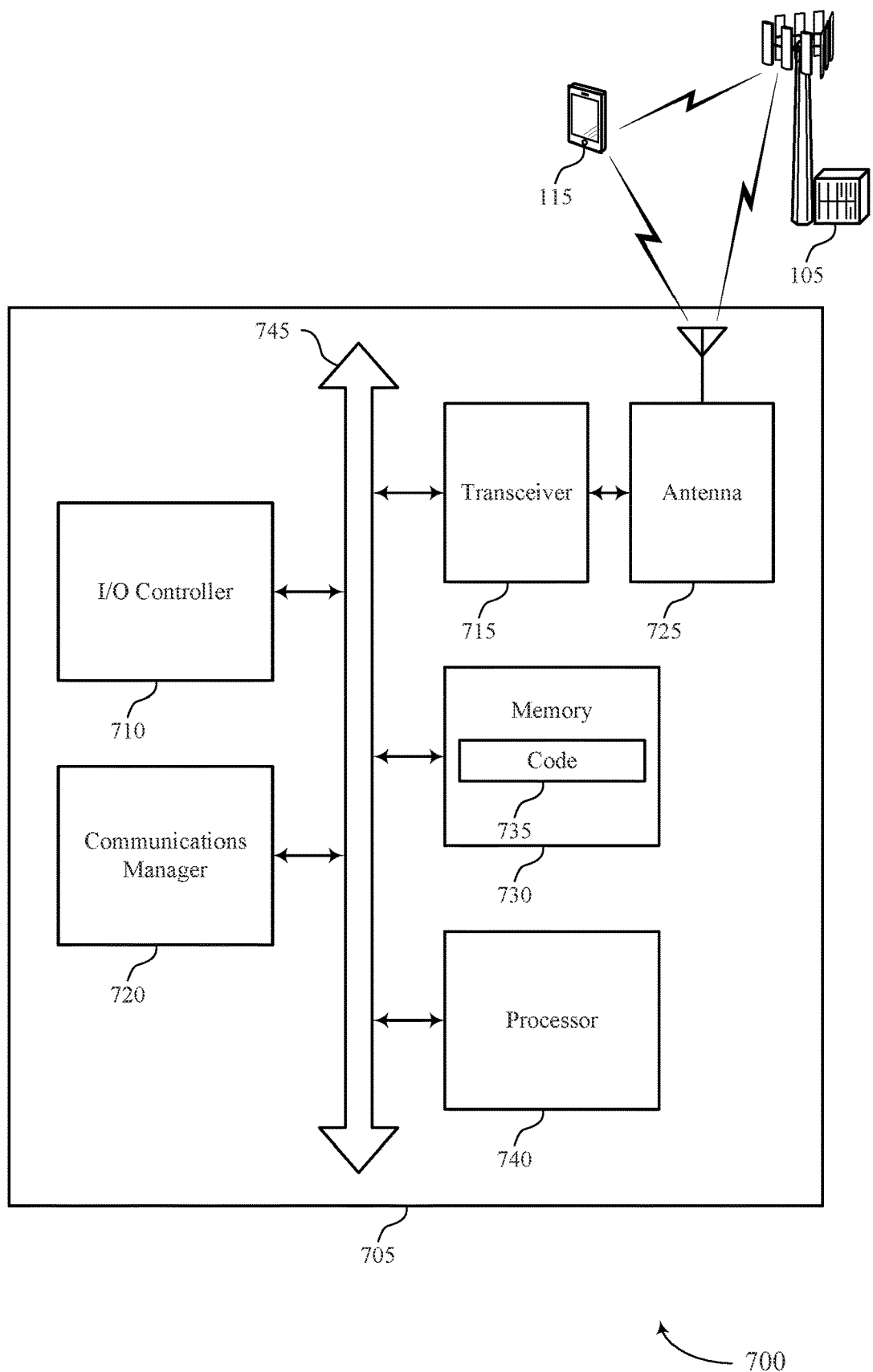
FIG. 7 shows a diagram of a system including a device that supports techniques for misbehavior detection in wireless communications systems in accordance with aspects of the present disclosure.

FIG. 7 shows a diagram of a system 700 including a device 705 that supports techniques for misbehavior detection in wireless communications systems in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for misbehavior detection in wireless communications systems). For example, the device 705 or a component of the device 705 may include a processor 740 and memory 730 coupled to the processor 740, the processor 740 and memory 730 configured to perform various functions described herein.

The communications manager 720 may support wireless communication at the device 705 in accordance with examples as disclosed herein. For example, the communications manager 720 may be configured as or otherwise support a means for receiving a set of packets during a time interval, each packet of the set of packets including a set of IE fields. The communications manager 720 may be configured as or otherwise support a means for determining a change to one or more IE fields of the set of IE fields and associated with at least a subset of packets of the set of packets based on comparing a respective value associated with each of the one or more IE fields to a respective default value associated with each of the one or more IE fields. The communications manager 720 may be configured as or otherwise support a means for transmitting a report including an indication of a set of multiple fuzzing attacks at the device 705 based on determining the change to the one or more IE fields of the set of IE fields and associated with the subset of packets of the set of packets.

By including or configuring the communications manager 720 in accordance with examples as described herein, the device 705 may support techniques for improved communication reliability, reduced latency, improved user experience related to reduced processing, reduced power consumption, more efficient utilization of communication resources, improved coordination between devices, longer battery life, improved utilization of processing capability, more secure communication and operation, and greater user safety.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for misbehavior detection in wireless communications systems as described herein, or the processor 740 and the memory 730 may be otherwise configured to perform or support such operations.

Figure 8:
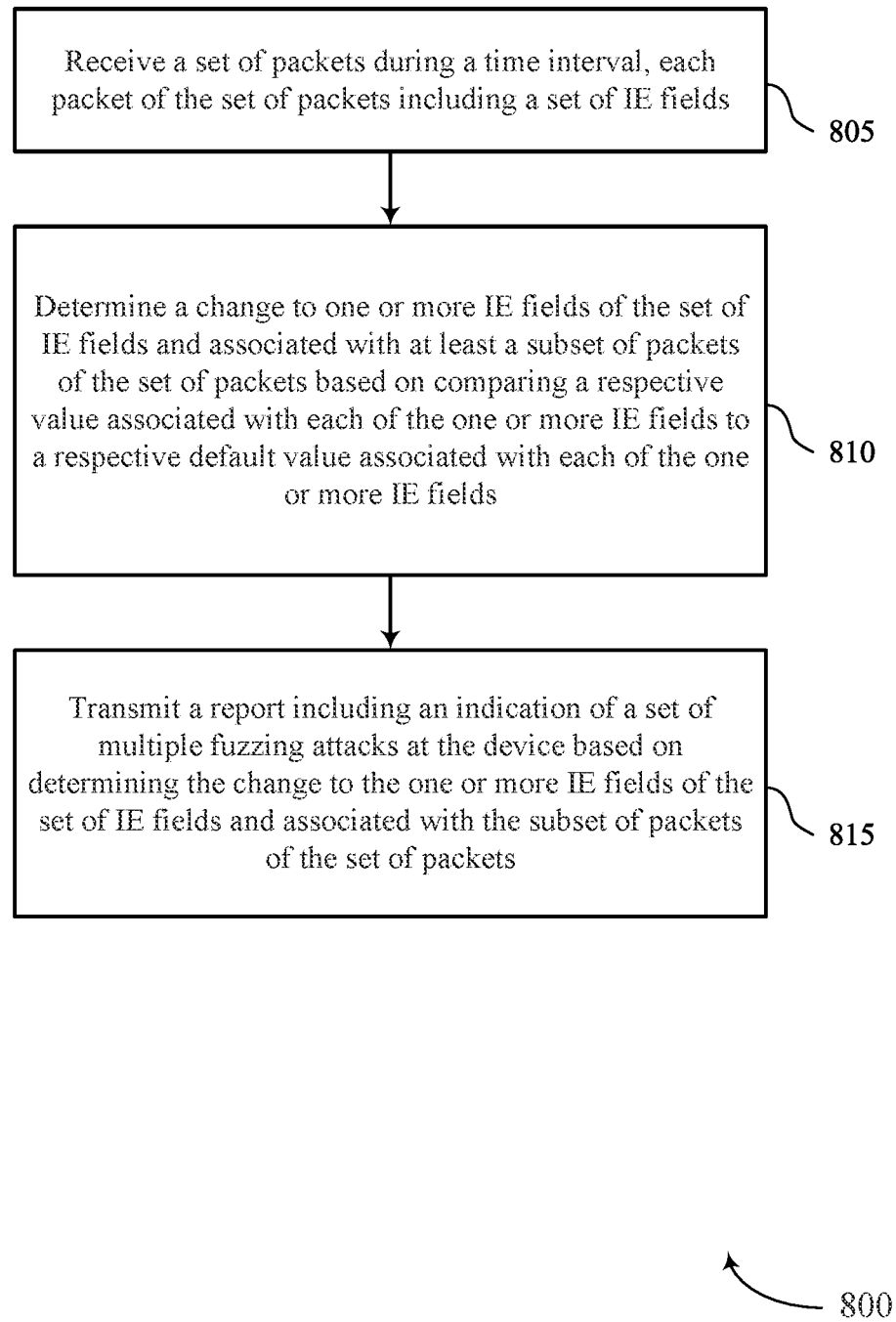
FIGS. 8 through 10 show flowcharts illustrating methods that support techniques for misbehavior detection in wireless communications systems in accordance with aspects of the present disclosure.

FIG. 8 shows a flowchart illustrating a method 800 that supports techniques for misbehavior detection in wireless communications systems in accordance with aspects of the present disclosure. The operations of the method 800 may be implemented by a UE or its components as described herein. For example, the operations of the method 800 may be performed by a UE as described with reference to FIGS. 1 through 7. In some examples, a UE may execute a set of instructions to control the functional elements of the UE to perform the described functions. Additionally or alternatively, a UE may perform aspects of the described functions using special-purpose hardware.

At 805, the method may include receiving a set of packets during a time interval, each packet of the set of packets including a set of IE fields. The operations of 805 may be performed in accordance with examples as disclosed herein. In some examples, aspects of the operations of 805 may be performed by a packet component 625 as described with reference to FIG. 6.

At 810, the method may include determining a change to one or more IE fields of the set of IE fields and associated with at least a subset of packets of the set of packets based on comparing a respective value associated with each of the one or more IE fields to a respective default value associated with each of the one or more IE fields. The operations of 810 may be performed in accordance with examples as disclosed herein. In some examples, aspects of the operations of 810 may be performed by a detection component 630 as described with reference to FIG. 6.

At 815, the method may include transmitting a report including an indication of a set of multiple fuzzing attacks at the device based on determining the change to the one or more IE fields of the set of IE fields and associated with the subset of packets of the set of packets. The operations of 815 may be performed in accordance with examples as disclosed herein. In some examples, aspects of the operations of 815 may be performed by a report component 635 as described with reference to FIG. 6.

Figure 9:
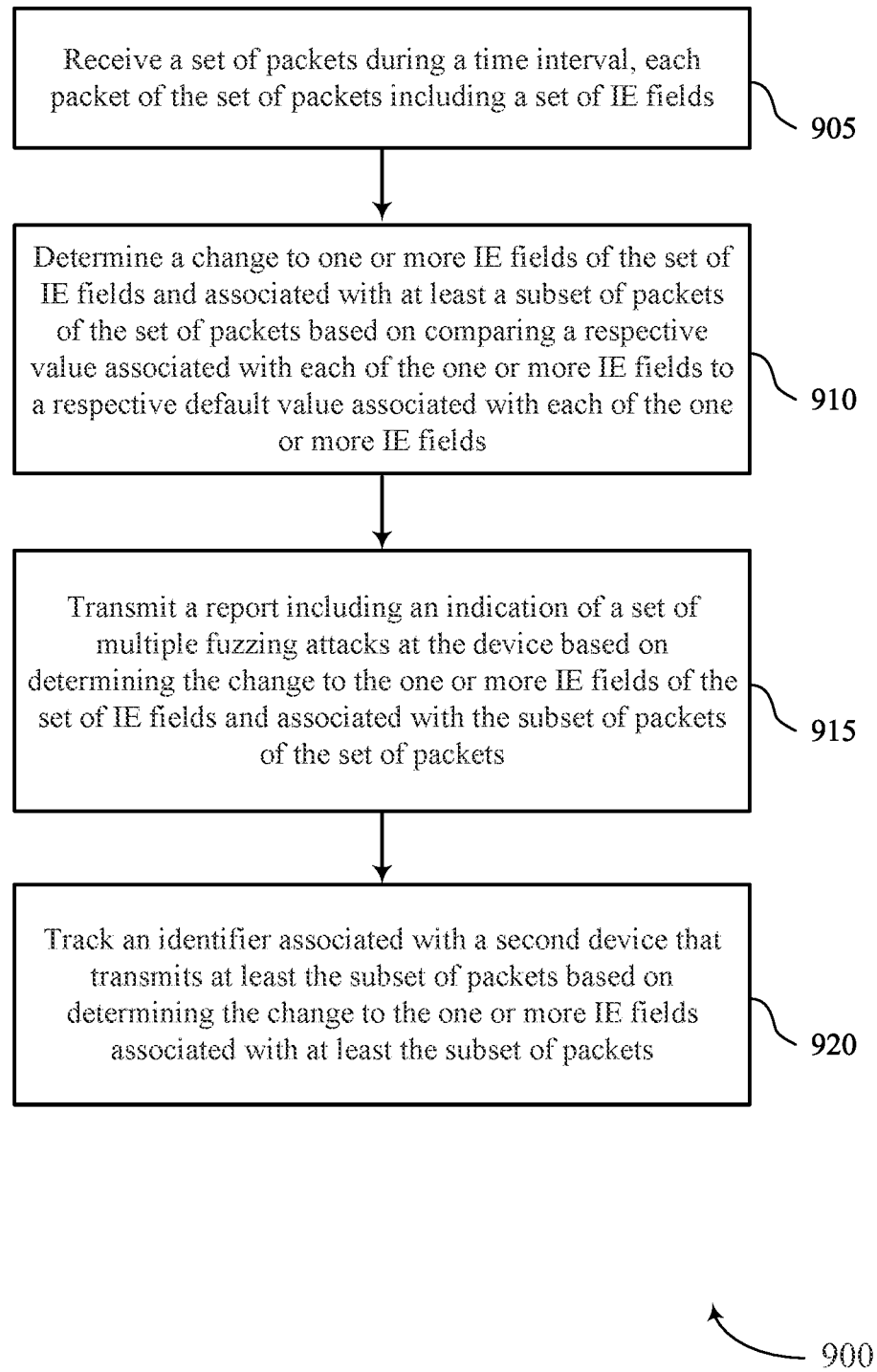

FIG. 9 shows a flowchart illustrating a method 900 that supports techniques for misbehavior detection in wireless communications systems in accordance with aspects of the present disclosure. The operations of the method 900 may be implemented by a UE or its components as described herein. For example, the operations of the method 900 may be performed by a UE as described with reference to FIGS. 1 through 7. In some examples, a UE may execute a set of instructions to control the functional elements of the UE to perform the described functions. Additionally or alternatively, a UE may perform aspects of the described functions using special-purpose hardware.

At 905, the method may include receiving a set of packets during a time interval, each packet of the set of packets including a set of IE fields. The operations of 905 may be performed in accordance with examples as disclosed herein. In some examples, aspects of the operations of 905 may be performed by a packet component 625 as described with reference to FIG. 6.

At 910, the method may include determining a change to one or more IE fields of the set of IE fields and associated with at least a subset of packets of the set of packets based on comparing a respective value associated with each of the one or more IE fields to a respective default value associated with each of the one or more IE fields. The operations of 910 may be performed in accordance with examples as disclosed herein. In some examples, aspects of the operations of 910 may be performed by a detection component 630 as described with reference to FIG. 6.

At 915, the method may include transmitting a report including an indication of a set of multiple fuzzing attacks at the device based on determining the change to the one or more IE fields of the set of IE fields and associated with the subset of packets of the set of packets. The operations of 915 may be performed in accordance with examples as disclosed herein. In some examples, aspects of the operations of 915 may be performed by a report component 635 as described with reference to FIG. 6.

At 920, the method may include tracking an identifier (e.g., a MAC address, a sender ID, or a digital signature or certificate) associated with a second device that transmits at least the subset of packets based on determining the change to the one or more IE fields associated with at least the subset of packets. The operations of 920 may be performed in accordance with examples as disclosed herein. In some examples, aspects of the operations of 920 may be performed by an attacker component 650 as described with reference to FIG. 6.

Figure 10:
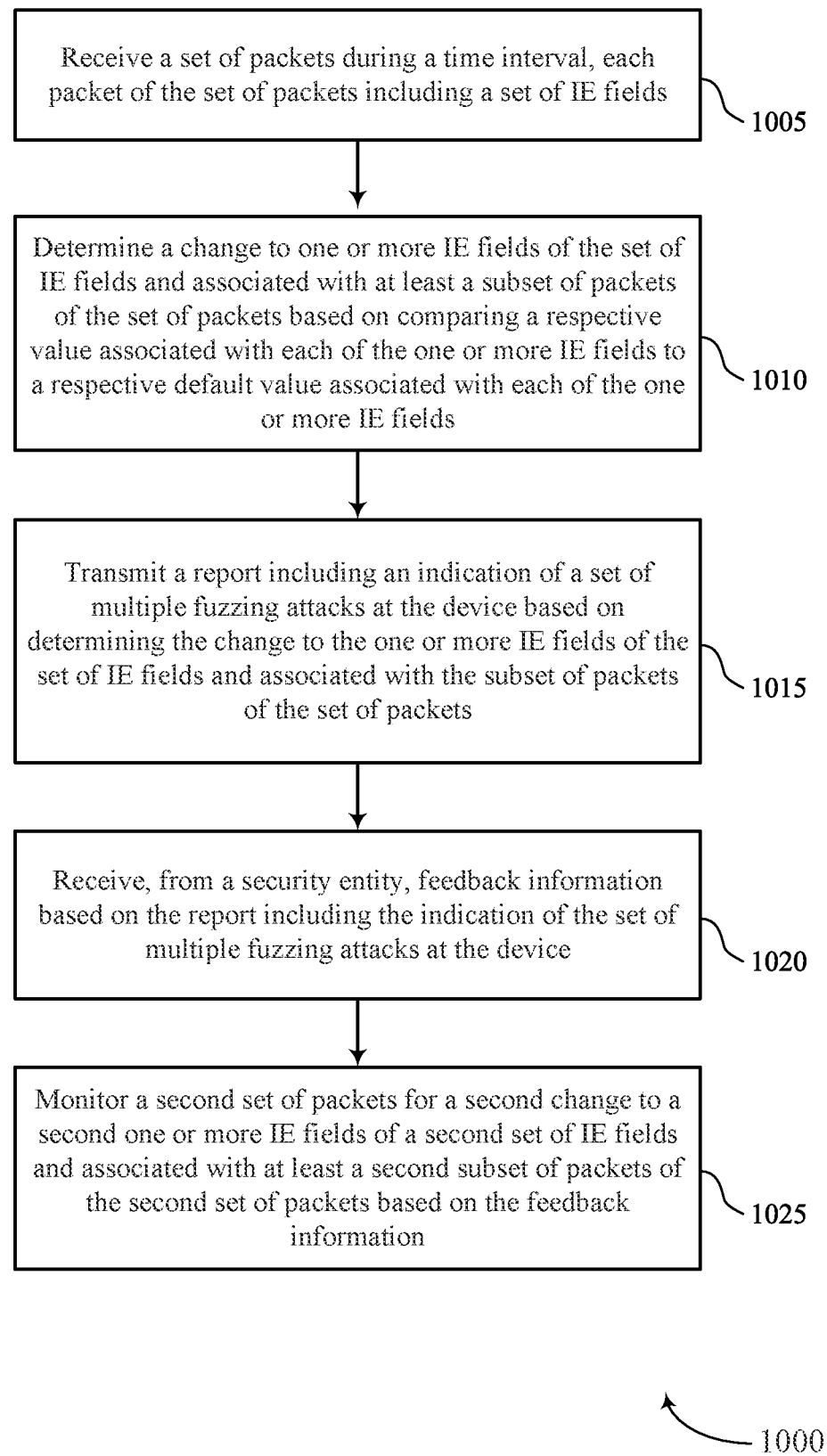

FIG. 10 shows a flowchart illustrating a method 1000 that supports techniques for misbehavior detection in wireless communications systems in accordance with aspects of the present disclosure. The operations of the method 1000 may be implemented by a UE or its components as described herein. For example, the operations of the method 1000 may be performed by a UE as described with reference to FIGS. 1 through 7. In some examples, a UE may execute a set of instructions to control the functional elements of the UE to perform the described functions. Additionally or alternatively, a UE may perform aspects of the described functions using special-purpose hardware.

At 1005, the method may include receiving a set of packets during a time interval, each packet of the set of packets including a set of IE fields. The operations of 1005 may be performed in accordance with examples as disclosed herein. In some examples, aspects of the operations of 1005 may be performed by a packet component 625 as described with reference to FIG. 6.

At 1010, the method may include determining a change to one or more IE fields of the set of IE fields and associated with at least a subset of packets of the set of packets based on comparing a respective value associated with each of the one or more IE fields to a respective default value associated with each of the one or more IE fields. The operations of 1010 may be performed in accordance with examples as disclosed herein. In some examples, aspects of the operations of 1010 may be performed by a detection component 630 as described with reference to FIG. 6.

At 1015, the method may include transmitting a report including an indication of a set of multiple fuzzing attacks at the device based on determining the change to the one or more IE fields of the set of IE fields and associated with the subset of packets of the set of packets. The operations of 1015 may be performed in accordance with examples as disclosed herein. In some examples, aspects of the operations of 1015 may be performed by a report component 635 as described with reference to FIG. 6.

At 1020, the method may include receiving, from a security entity, feedback information based on the report including the indication of the set of multiple fuzzing attacks at the device. The operations of 1020 may be performed in accordance with examples as disclosed herein. In some examples, aspects of the operations of 1020 may be performed by a feedback component 655 as described with reference to FIG. 6.

At 1025, the method may include monitoring a second set of packets for a second change to a second one or more IE fields of a second set of IE fields and associated with at least a second subset of packets of the second set of packets based on the feedback information. The operations of 1025 may be performed in accordance with examples as disclosed herein. In some examples, aspects of the operations of 1025 may be performed by a misbehavior detection component 630 as described with reference to FIG. 6.

The following provides an overview of aspects of the present disclosure:

Aspect 1: A method for wireless communication at a device, comprising: receiving a set of packets during a time interval, each packet of the set of packets comprising a set of IE fields; determining a change to one or more IE fields of the set of IE fields and associated with at least a subset of packets of the set of packets based at least in part on comparing a respective value associated with each of the one or more IE fields to a respective default value associated with each of the one or more IE fields; and transmitting a report comprising an indication of a plurality of fuzzing attacks at the device based at least in part on determining the change to the one or more fields of the set of IE fields and associated with the subset of packets of the set of packets.

Aspect 2: The method of aspect 1, wherein determining the change to the one or more IE fields of the set of IE fields and associated with at least the subset of packets comprises: determining whether a value of each information field of the one or more IE fields satisfies a threshold value for at least the subset of packets, wherein the threshold value comprise the respective default value associated with each of the one or more IE fields.

Aspect 3: The method of any of aspects 1 through 2, further comprising: determining a pattern associated with a fuzzing attack for at least the subset of packets, the pattern indicating an increase or a decrease in the respective value associated with each of the one or more IE fields, wherein the increase or the decrease in the respective value associated with each of the one or more IE fields is based at least in part on a randomness, the pattern identifying a data type associated with each of the one or more IE fields, wherein determining the change to the one or more IE fields of the set of IE fields and associated with at least the subset of packets is based at least in part on the pattern associated with the fuzzing attack for at least the subset of packets.

Aspect 4: The method of any of aspects 1 through 3, wherein determining the change to the one or more IE fields of the set of IE fields and associated with at least the subset of packets of the set of packets is based at least in part on a machine learning algorithm.

Aspect 5: The method of any of aspects 1 through 4, further comprising: aggregating evidence of a plurality of misbehaviors based at least in part on determining the change to the one or more IE fields of the set of IE fields and associated with at least the subset of packets of the set of packets, each misbehavior of the plurality of misbehaviors corresponding to an instance of the respective value associated with each of the one or more IE fields differing from the respective default value associated with each of the one or more IE fields; storing the evidence of the plurality of misbehaviors to detect the plurality of fuzzing attacks; and transmitting the evidence of the plurality of misbehaviors to indicate the plurality of fuzzing attacks at the device.

Aspect 6: The method of aspect 5, wherein the evidence of the plurality of misbehaviors indicating the plurality of fuzzing attacks is transmitted via the report.

Aspect 7: The method of any of aspects 1 through 6, wherein transmitting the report comprising the indication of the plurality of fuzzing attacks at the device comprises: transmitting information associated with at least the subset of packets based at least in part on determining the change to the one or more IE fields of the set of IE fields and associated with at least the subset of packets, the information indicating a detected misbehavior for each of at least the subset of packets and a time stamp associated with the detected misbehavior for each of at least the subset of packets.

Aspect 8: The method of any of aspects 1 through 7, further comprising: tracking an identifier associated with a second device that transmits at least the subset of packets based at least in part on determining the change to the one or more IE fields associated with at least the subset of packets.

Aspect 9: The method of any of aspects 1 through 8, further comprising: receiving, from a security entity, feedback information based at least in part on the report comprising the indication of the plurality of fuzzing attacks at the device; and monitoring a second set of packets for a second change to a second one or more IE fields of a second set of IE fields and associated with at least a second subset of packets of the second set of packets based at least in part on the feedback information.

Aspect 10: The method of aspect 9, wherein the feedback information comprises an acknowledgement of the indication of the plurality of fuzzing attacks at the device.

Aspect 11: The method of any of aspects 9 through 10, wherein the feedback information comprises a negative acknowledgement of the indication of the plurality of fuzzing attacks at the device, and wherein the feedback information indicates that the change to the one or more IE fields associated with at least the subset of packets is associated with a plurality of separate attacks, the method further comprising: adjusting a detection criteria for fuzzing attacks based at least in part on the feedback information comprising the negative acknowledgement, wherein monitoring the second set of packets for the change to the second one or more IE fields of the second set of IE fields is based at least in part on the adjusting of the detection criteria for fuzzing attacks.

Aspect 12: The method of any of aspects 1 through 11, wherein the time interval comprises a pre-configured time interval or a dynamically configured time interval.

Aspect 13: The method of any of aspects 1 through 12, wherein the device operates within a V2X communications system, and the set of packets comprise a set of V2X messages.

Aspect 14: An apparatus for wireless communication at a device, comprising a processor; memory coupled with the processor; and instructions stored in the memory and executable by the processor to cause the apparatus to perform a method of any of aspects 1 through 13.

Aspect 15: An apparatus for wireless communication at a device, comprising at least one means for performing a method of any of aspects 1 through 13.

Aspect 16: A non-transitory computer-readable medium storing code for wireless communication at a device, the code comprising instructions executable by a processor to perform a method of any of aspects 1 through 13.

It should be noted that the methods described herein describe possible implementations, and that the operations and the steps may be rearranged or otherwise modified and that other implementations are possible. Further, aspects from two or more of the methods may be combined.

Although aspects of an LIE, LTE-A, LTE-A Pro, or NR system may be described for purposes of example, and LTE LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a device, comprising:
    receiving a set of vehicle-to-everything (V2X) messages during a time window for detection of fuzzing attacks, each V2X message of the set of V2X messages comprising a set of information element fields associated with V2X operations of a second device in accordance with the device operating within a V2X communications system;
    determining a change to one or more information element fields of the set of information element fields in multiple V2X messages of the set of V2X messages received in the time window based at least in part on a comparison of a respective value associated with each of the one or more information element fields to a respective expected value associated with each of the one or more information element fields, each V2X message of the multiple V2X messages comprising a same identifier associated with the second device and comprising a respective basic safety message associated with the V2X operations of the second device;
    detecting a fuzzing attack associated with the multiple V2X messages of the set of V2X messages received in the time window based at least in part on determining the change; and
    transmitting, to a network entity, a single report indicating the fuzzing attack and including evidence of the fuzzing attack aggregated from the multiple V2X messages based at least in part on determining the change and based at least in part on the multiple V2X messages comprising the same identifier.

2. The method of claim 1, wherein determining the change to the one or more information element fields of the set of information element fields comprises:
    determining whether a value of each of the one or more information element fields of the multiple V2X messages satisfies a respective threshold value, wherein the respective threshold value comprises the respective expected value associated with each of the one or more information element fields.

3. The method of claim 1, further comprising:
    determining a pattern associated with the fuzzing attack for the multiple V2X messages, the pattern indicating an increase or a decrease in the respective value associated with each of the one or more information element fields, wherein the increase or the decrease in the respective value associated with each of the one or more information element fields is based at least in part on a randomness, the pattern identifying a data type associated with each of the one or more information element fields, wherein determining the change to the one or more information element fields of the set of information element fields is based at least in part on the pattern associated with the fuzzing attack for the multiple V2X messages.

4. The method of claim 1, wherein determining the change to the one or more information element fields of the set of information element fields is based at least in part on a machine learning algorithm.

5. The method of claim 1, further comprising:
    aggregating evidence of a plurality of misbehaviors based at least in part on determining the change to the one or more information element fields of the set of information element fields, each misbehavior of the plurality of misbehaviors corresponding to an instance of the respective value associated with each of the one or more information element fields differing from the respective expected value associated with each of the one or more information element fields; and
    storing the evidence of the plurality of misbehaviors, wherein detecting the fuzzing attack is based at least in part on storing the evidence, and wherein the single report includes the evidence of the plurality of misbehaviors.

6. The method of claim 1, wherein transmitting the single report indicating the fuzzing attack and including the evidence aggregated from the multiple V2X messages comprises:
    transmitting, to the network entity, information associated with the multiple V2X messages based at least in part on determining the change to the one or more information element fields of the set of information element fields, the information indicating a detected misbehavior for each of the multiple V2X messages and a time stamp associated with the detected misbehavior for each of the multiple V2X messages.

7. The method of claim 1, further comprising:
    tracking the same identifier associated with the second device that transmits at the multiple V2X messages based at least in part on determining the change to the one or more information element fields.

8. The method of claim 1, further comprising:
    receiving, from the network entity, feedback information based at least in part on the single report indicating the fuzzing attack; and
    monitoring a second set of V2X messages for a second change to a second one or more information element fields of a second set of information element fields in multiple V2X messages of the second set of V2X messages based at least in part on the feedback information.

9. The method of claim 8, wherein the feedback information comprises an acknowledgement of the single report indicating the fuzzing attack.

10. The method of claim 8, wherein the feedback information comprises a negative acknowledgement of the single report indicating the fuzzing attack, and wherein the feedback information indicates that the change to the one or more information element fields is associated with a plurality of separate attacks, the method further comprising:

adjusting a detection criteria for fuzzing attacks based at least in part on the feedback information comprising the negative acknowledgement, wherein monitoring the second set of V2X messages for the change to the second one or more information element fields of the second set of information element fields is based at least in part on the adjusting of the detection criteria for fuzzing attacks.

11. The method of claim 1, wherein the time window for detection of fuzzing attacks comprises a pre-configured time window or a dynamically configured time window.

12. A device for wireless communication, comprising:
one or more memories storing processor-executable code; and
one or more processors coupled with the one or more memories and individually or collectively operable to execute the code to cause the apparatus device to:
receive a set of vehicle-to-everything (V2X) messages during a time window for detection of fuzzing attacks, each V2X message of the set of V2X messages comprising a set of information element fields associated with V2X operations of a second device in accordance with the device operating within a V2X communications system;
determine a change to one or more information element fields of the set of information element fields in multiple V2X messages of the set of V2X messages received in the time window based at least in part on a comparison of a respective value associated with each of the one or more information element fields to a respective expected value associated with each of the one or more information element fields, each V2X message of the multiple V2X messages comprising a same identifier associated with the second device and comprising a respective basic safety message associated with the V2X operations of the second device;
detect a fuzzing attack associated with the multiple V2X messages of the set of V2X messages received in the time window based at least in part on determining the change; and
transmit, to a network entity, a single report indicating the fuzzing attack and including evidence of the fuzzing attack aggregated from the multiple V2X messages based at least in part on determining the change and based at least in part on the multiple V2X messages comprising the same identifier.

13. The device of claim 12, wherein, to determine the change to the one or more information element fields of the set of information element fields, the one or more processors are individually or collectively operable to cause the device to:
determine whether a value of each of the one or more information element fields of the multiple V2X messages satisfies a respective threshold value, wherein the respective threshold value comprises the respective expected value associated with each of the one or more information element fields.

14. The device of claim 12, wherein the one or more processors are individually or collectively further operable to cause the device to:
determine a pattern associated with the fuzzing attack for of the multiple V2X messages, the pattern indicating an increase or a decrease in the respective value associated with each of the one or more information element fields, wherein the increase or the decrease in the respective value associated with each of the one or more information element fields is based at least in part on a randomness, the pattern identifying a data type associated with each of the one or more information element fields, wherein the one or more processors are individually or collectively operable to determine the change to the one or more information element fields of the set of information element fields based at least in part on the pattern associated with the fuzzing attack for the multiple V2X messages.

15. The device of claim 12, wherein the one or more processors are individually or collectively operable to determine the change to the one or more information element fields of the set of information element fields based at least in part on a machine learning algorithm.

16. The device of claim 12, wherein the one or more processors are individually or collectively further operable to cause the device to:
aggregate evidence of a plurality of misbehaviors based at least in part on determining the change to the one or more information element fields of the set of information element fields, each misbehavior of the plurality of misbehaviors corresponding to an instance of the respective value associated with each of the one or more information element fields differing from the respective expected value associated with each of the one or more information element fields; and
store the evidence of the plurality of misbehaviors, wherein detecting the fuzzing attack is based at least in part on storing the evidence and wherein the single report includes the evidence of the plurality of misbehaviors.

17. An device for wireless communication, comprising:
means for receiving a set of vehicle-to-everything (V2X) messages during a time window for detection of fuzzing attacks, each V2X message of the set of V2X messages comprising a set of information element fields associated with V2X operations of a second device in accordance with the device operating within a V2X communications system;
means for determining a change to one or more information element fields of the set of information element fields in multiple V2X messages of the set of V2X messages received in the time window based at least in part on a comparison of a respective value associated with each of the one or more information element fields to a respective expected value associated with each of the one or more information element fields, each V2X message of the multiple V2X messages comprising a same identifier associated with the second device and comprising a respective basic safety message associated with the V2X operations of the second device;
means for detecting a fuzzing attack associated with the multiple V2X messages of the set of V2X messages received in the time window based at least in part on determining the change; and
means for transmitting, to a network entity, a single report indicating the fuzzing attack and including evidence of the fuzzing attack aggregated from the multiple V2X messages based at least in part on determining the change and based at least in part on the multiple V2X messages comprising the same identifier.

* * * * *